UNITED STATES PATENT OFFICE.

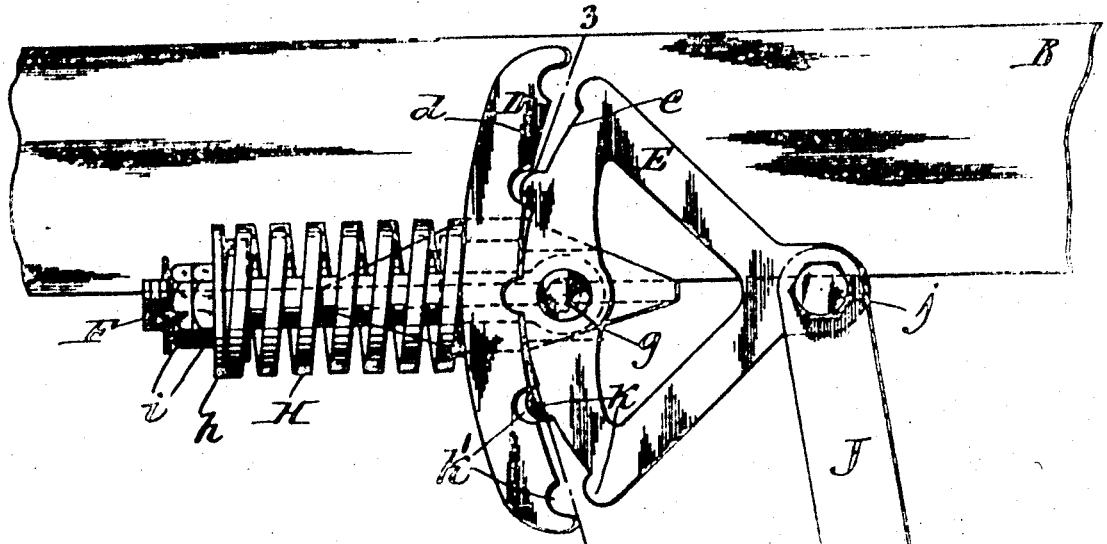
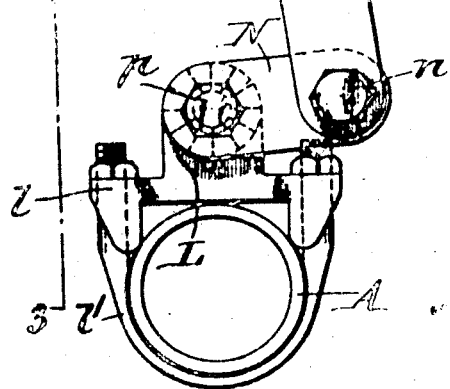

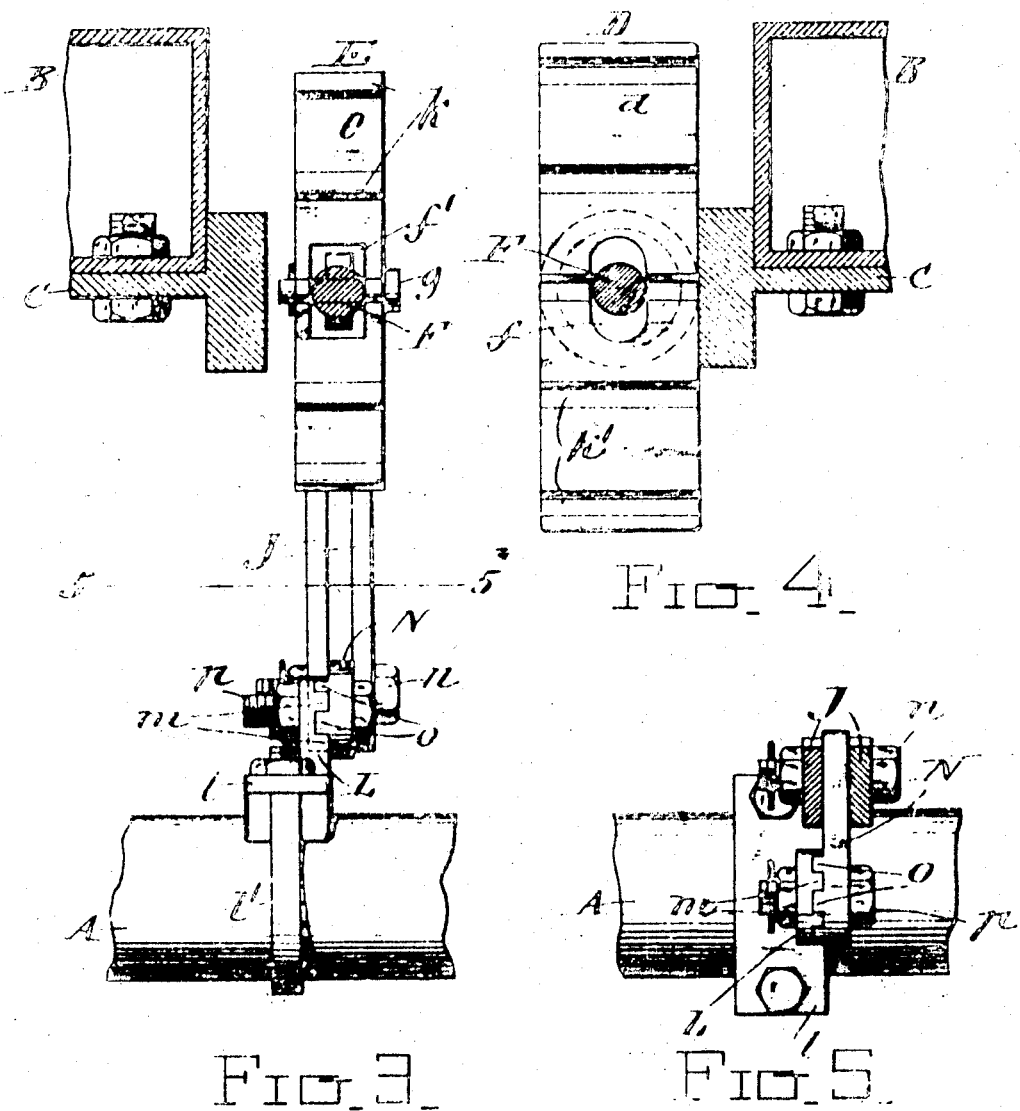

JOHN H. OTTEN, OF BUFFALO, NEW YORK.

SHOCK-ABSORBER.

945,190.

Specification of Letters Patent.

Patented Jan. 4, 1910.

Application filed April 26, 1909. Serial No. 492,296.

*To all whom it may concern:*

Be it known that I, JOHN H. OTTEN, a citizen of the United States, residing at Buffalo, in the county of Erie and State of New York, have invented a new and useful Improvement in Shock-Absorbers, of which the following is a specification.

This invention relates to a shock absorber or cushioning device which is more particularly designed for preventing shock or jouncing of automobiles or other vehicles when running over an uneven road but which may also be used for other purposes in which like conditions exist.

The object of this invention is to produce a device of this character which is comparatively simple and durable in construction, efficient in operation and capable of being readily applied to automobiles or similar vehicles.

In the accompanying drawings consisting of two sheets: Figure 1 is a side elevation of my improved shock absorber showing the same applied to the axle and frame of an automobile. Fig. 2 is a top plan view thereof. Figs. 3 and 4 are vertical transverse sections in line 3—3, Fig. 1, looking in opposite directions. Fig. 5 is a horizontal section taken in line 5—5, Fig. 3.

Similar letters of reference indicate corresponding parts throughout the several views.

Although my improved shock absorber may be variously applied to an automobile the same is represented in the drawings as interposed between the axle A and the frame B of an automobile which parts are movable relatively to one another.

The preferred embodiment of my improved shock absorber is shown in the drawings and is constructed as follows:

C represents a bracket secured to the underside of the side bar or other part B of the automobile frame and provided at one end with an abutment D having an upright bearing face $d$ on its front side which is preferably curved inwardly.

E represents a vertical rocking member which is preferably constructed in the form of a segment and provided with an outwardly curved face $e$ which engages with the curved face of the abutment. The rocking member is yieldingly held by a tension device in its central or normal position in which the central part of its curved face engages with the abutment so that any tendency to roll or rock said segment either upwardly or downwardly out of its central or normal position will be restrained or resisted. The preferred means for this purpose consists of a horizontal tension rod F arranged in an upright slot $f$ in the abutment extending from the front side or face to the back side thereof, and also arranged at its front end in an opening $f^1$ in the central part of the rocking segment, a horizontal pin $g$ extending transversely through the rocking segment adjacent to the central part of its curved front face and pivotally connecting the front end of the tension rod with the segment, a coil spring H surrounding the tension rod and bearing at its front end against the rear side of the abutment, a collar $h$ arranged on the rear end of the tension rod and bearing against the rear end of the spring, and screw nuts $i$ arranged on the threaded rear end of the tension rod and engaging with the rear side of the collar. At its outer end preferably horizontally in line with the central part of the face of the segment the same is pivotally connected by a horizontal bolt $j$ or otherwise with the upper ends of a pair of shifting links J which latter are operatively connected at their lower ends with the axle A so that when the latter and the frame move one relatively to the other out of their normal position, the segment will be rocked either up or down out of its central position on the abutment. Either of these movements of the segment causes the tension rod to be pulled forward and the spring to be compressed, and the strain on the same increased. This strain on the spring increases in proportion to the extent to which the segment is rocked either upwardly or downwardly by the approach of the axle and frame or the separation thereof out of their normal or central position, owing to the increase in the leverage of the segment toward either of its heels. This increased leverage not only increases the tension on the spring but also enables the latter to offer gradually increasing resistance to the rocking movement of the segment out of its normal central position, whereby the cushioning or absorbing effect of this device is automatically adapted to the shock or load which moves the axle and frame out of the normal position, the cushioning effect being small when only a slight deflection of the axle and frame out of the normal occurs and proportionately greater as this deflection increases.

For the purpose of preventing slippage of the segment on the abutment and insuring a rocking movement of the same, the opposing faces of the segment and abutment are provided with coöperating interlocking means which preferably consists of a row of teeth $k$ arranged on the face of the segment and a corresponding row of recesses $k^1$ on the face of the abutment adapted to receive said teeth.

At its lower end the links J are preferably adjustably connected with the axle, so as to permit of adapting the shock absorber to the load to be carried and also to adapt the same to automobiles in which the distance between the axle and frame varies. The preferred means for this purpose which are shown in the drawings consist of a bracket L which is formed on the upper side of a clip plate $l$ secured by its clip $l^1$ to the axle and which is provided on one side with an annular row of teeth $m$, an adjusting arm N pivotally connected at one end by a bolt $n$ with the lower ends of the shifting links and provided at its opposite end with an annular row of teeth $o$ which interlock with the teeth of said bracket, and a clamping bolt $p$ connecting said bracket and adjusting arm and arranged centrally within the rows of teeth thereof. Upon interlocking the teeth of the bracket with the teeth of the arm after the latter has been adjusted to the desired position and then tightening the bolt $p$ the parts will be held in their relatively adjusted position to suit the distance between the axle and frame or the normal load which is carried.

I claim as my invention:

1. A shock absorber adapted to be applied to two parts which are movable relatively to one another, comprising an abutment adapted to be connected with one of said parts, a rocking member adapted to roll on said abutment and to be connected with the other part, and a tension device for yieldingly holding said rocking member in its normal position.

2. A shock absorber adapted to be applied to two parts which are movable relatively to one another, comprising an abutment adapted to be connected with one of said parts and having a bearing face, a rocking member adapted to be connected with the other part and provided with a segmental face engaging with the bearing face of said abutment, and a tension device for yieldingly holding the rocking member in its central or normal position.

3. A shock absorber adapted to be applied to two parts which are movable relatively to one another, comprising an abutment adapted to be connected with one of said parts and having a bearing face, a rocking member adapted to be connected with the other part and provided with a segmental face engaging with the bearing face of said abutment, and a tension device for yieldingly holding the rocking member in its central position comprising a tension rod connected with the central part of the rocking member, and a spring interposed between said rod and said abutment.

4. A shock absorber adapted to be applied to two parts which are movable relatively to one another, comprising an abutment adapted to be connected with one of said parts and having a bearing face, and a central opening extending from the face of the abutment to the back thereof, a rocking member provided with a segmental face engaging with the bearing face of said abutment and adapted to be connected on its opposite end with said other part, a tension rod pivoted on said rocking member adjacent to the central part of its segmental face, and a spring interposed between the back of said abutment and the adjacent part of the tension rod and operating to yieldingly hold said rocking member in its central position.

5. A shock absorber adapted to be applied to two parts which are movable relatively to one another, comprising an abutment adapted to be connected with one of said parts, a rocking member adapted to roll on said abutment, a tension device for yieldingly holding said rocking member in its central position, and a link connected at one end with said rocking member and at its opposite end with said other movable part.

6. A shock absorber adapted to be applied to two parts which are movable relatively to one another, comprising an abutment adapted to be connected with one of said parts, a rocking member adapted to roll on said abutment, a tension device for yieldingly holding said rocking member in its central position, a link connected at one end with said rocking member, and means for adjustably connecting the other end of said link with said other part.

7. A shock absorber adapted to be applied to two parts which are movable relatively to one another, comprising an abutment adapted to be connected with one of said parts, a rocking member adapted to roll on said abutment, a tension device for yieldingly holding said rocking member in its central position, a link connected at one end with said rocking member, and means for adjustably connecting the other end of said link with said other part comprising a bracket adapted to be secured to said other part and having a toothed face, an arm pivotally connected with the other end of said link and having a toothed face engaging with the toothed face of said bracket, and a bolt connecting said bracket and arm.

3. A shock absorber adapted to be applied to two parts which are movable relatively to one another, comprising an abutment adapted to be connected with one of said parts, a rocking member adapted to roll on said abutment and to be connected with the other part, and a tension device for yieldingly holding said rocking member in its central position, said abutment and rocking member being provided in their coöperating faces with corresponding teeth and recesses.

Witness my hand this 20th day of April, 1909.

JOHN H. OTTEN.

Witnesses:
 THEO. L. POPP,
 ANNA HEIGIS.